(12) United States Patent
Park et al.

(10) Patent No.: US 9,059,792 B2
(45) Date of Patent: Jun. 16, 2015

(54) NOISE REMOVAL METHOD AND SYSTEM

(75) Inventors: Jin Hong Park, Busan (KR); Young Jae Ko, Hwaseong-si (KR); Min Seok Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 553 days.

(21) Appl. No.: 13/415,117

(22) Filed: Mar. 8, 2012

(65) Prior Publication Data

US 2012/0257768 A1 Oct. 11, 2012

(30) Foreign Application Priority Data

Apr. 5, 2011 (KR) ........................ 10-2011-0031146

(51) Int. Cl.
*A61F 11/06* (2006.01)
*H04B 15/00* (2006.01)
(52) U.S. Cl.
CPC ...................................... *H04B 15/00* (2013.01)
(58) Field of Classification Search
USPC ........... 381/58, 73.1, 77, 81, 94.1, 94.5, 94.7, 381/56, 71.1, 74, 111–123; 455/501, 425, 455/67.11, 67.13, 114.2, 278.1, 296, 310, 455/556.1, 557.2; 330/51
See application file for complete search history.

(56) References Cited

U.S. PATENT DOCUMENTS 8,019,096 B2* 9/2011 Sander et al. ................. 381/123
8,600,080 B2* 12/2013 Sander et al. ................. 381/113
2011/0033060 A1* 2/2011 Johnson et al. ............... 381/71.6

* cited by examiner

*Primary Examiner* — Vivian Chin
*Assistant Examiner* — Friedrich W Fahnert
(74) *Attorney, Agent, or Firm* — Jefferson IP Law, LLP

(57) ABSTRACT

A method and system for removing noise due to bias electric power (MIC_Bias) or Time Division Multiple Access (TDMA) noise are provided. The system includes an interface with a microphone contact, for connecting to an accessory, an Analog-to-Digital (AD) converter for converting an analog voltage level, input via the microphone contact, into a digital voltage level, an audio processing unit for processing an audio signal input via the microphone contact, a switch for at least one of connecting and disconnecting the microphone contact and the AD converter, and a controller. The controller compares the digital voltage level with voltage levels stored in a look up table. The controller identifies a type of accessory connected to the interface. The controller also switches off the switch to prevent noise from being introduced into the audio signal via a wire connecting the microphone contact and the AD converter.

10 Claims, 3 Drawing Sheets

NOISE REMOVAL METHOD AND SYSTEM

PRIORITY

This application claims the benefit under 35 U.S.C. §119 (a) of a Korean patent application filed on Apr. 5, 2011 the Korean Intellectual Property Office and assigned Ser. No. 10-2011-0031146, the entire disclosure of which is hereby incorporated by reference.

BACKGROUND OF THE INVENTION

1. Field of the Invention

The present invention relates to noise removal systems. More particularly, the present invention relates to a method and system that can remove noise created by bias electric power (MIC_Bias) or by performing Time Division Multiple Access (TDMA) communication in a mobile device.

2. Description of the Related Art

With recent developments in technology and increased demand for various functions, mobile devices have been equipped with a variety of additional functions. The mobile devices can play back files, such as audio or video files for music or language learning, stored therein, so that a user can listen to or view corresponding audio or video. The mobile devices can also photograph pictures or record video via the camera function. They can also receive broadcast data from broadcast stations and reproduce them so that users can view broadcasts. The mobile devices can also provide an Internet function and transmit/receive Short Message Service (SMS) or Multimedia Message Service (MMS) messages.

More particularly, the mobile devices can play back various types of audio files stored therein and output audio sounds through a speaker, via an audio file playback function. Mobile device users frequently wear earphones to hear the audio sounds and to avoid disturbing others around them.

The mobile devices are equipped with an interface that is connected with a plug of headsets. The headsets are, usually, four-pole headsets with a microphone. When mobile devices are connected with the four-pole headsets, they may be subject to noise created by bias electric power (MIC_Bias) or by the use of Time Division Multiple Access (TDMA) communication. Such noise flows into an audio input-output terminal via circuitry on a Printed Circuit Board (PCB) of the mobile devices, thereby deteriorating the quality of output audio sounds.

The interface may allow the connection of various types of cables for accessories, such as audio cables, and the like. In this case, mobile devices require a circuitry to identify types of external devices connected thereto. In the mobile devices according to the related art, noise flows into the audio input-output terminal via an accessory identifying circuitry, thereby deteriorating the quality of audio sounds output from mobile devices.

SUMMARY OF THE INVENTION

Aspects of the present invention are to address the above-mentioned problems and/or disadvantages and to provide at least the advantages described below. Accordingly, an aspect of the present invention is to provide a method and system that can prevent noise from being introduced into an audio input-output terminal.

In accordance with an aspect of the present invention, a noise removal system is provided. The system includes an interface with a microphone contact, for connecting to an accessory, an Analog-to-Digital (AD) converter for converting an analog voltage level, input via the microphone contact, into a digital voltage level, an audio processing unit for processing an audio signal input via the microphone contact, a switch for connecting/disconnecting the microphone contact and the AD converter, and a controller. The controller compares the digital voltage level with voltage levels stored in a look up table. The controller identifies a type of accessory connected to the interface. The controller also switches off the switch to prevent noise from being introduced into the audio signal via a wire connecting the microphone contact and the AD converter.

In accordance with another aspect of the present invention, a method for removing noise in a system that includes an interface with a microphone contact, for connecting to an accessory, and an AD converter for converting an analog voltage level, input via the microphone contact, into a digital voltage level is provided. The method includes determining whether an accessory is connected to the interface, comparing, when an accessory is connected to the interface, the digital voltage level with voltage levels stored in a look up table and identifying a type of accessory connected to the interface, and switching off the switch to prevent noise from being introduced into the audio signal via a wire connecting the microphone contact and the AD converter when the type of accessory is identified.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
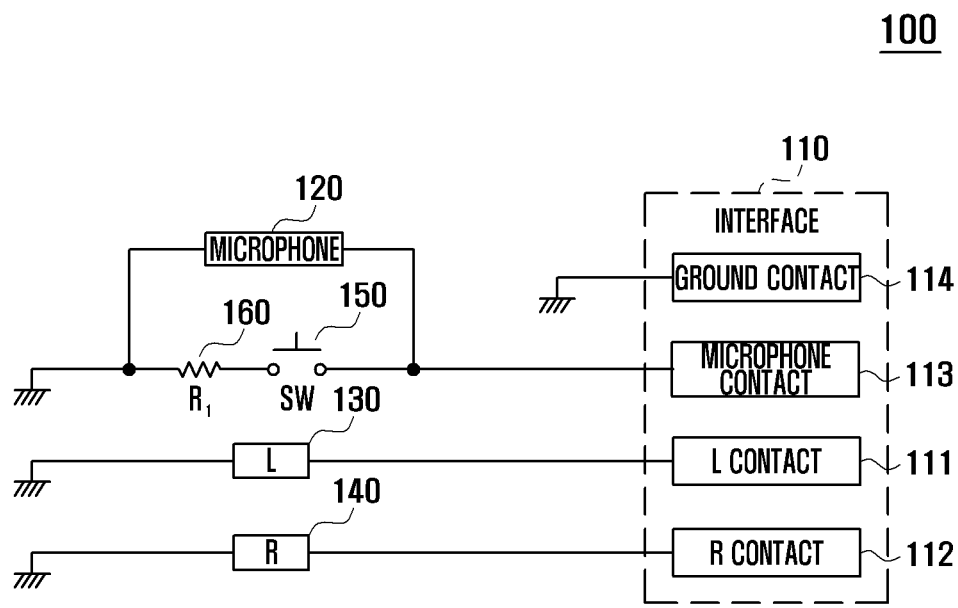
FIG. 1 illustrates a circuit diagram of a four pole earphone according to an exemplary embodiment of the present invention.
Figure 2:
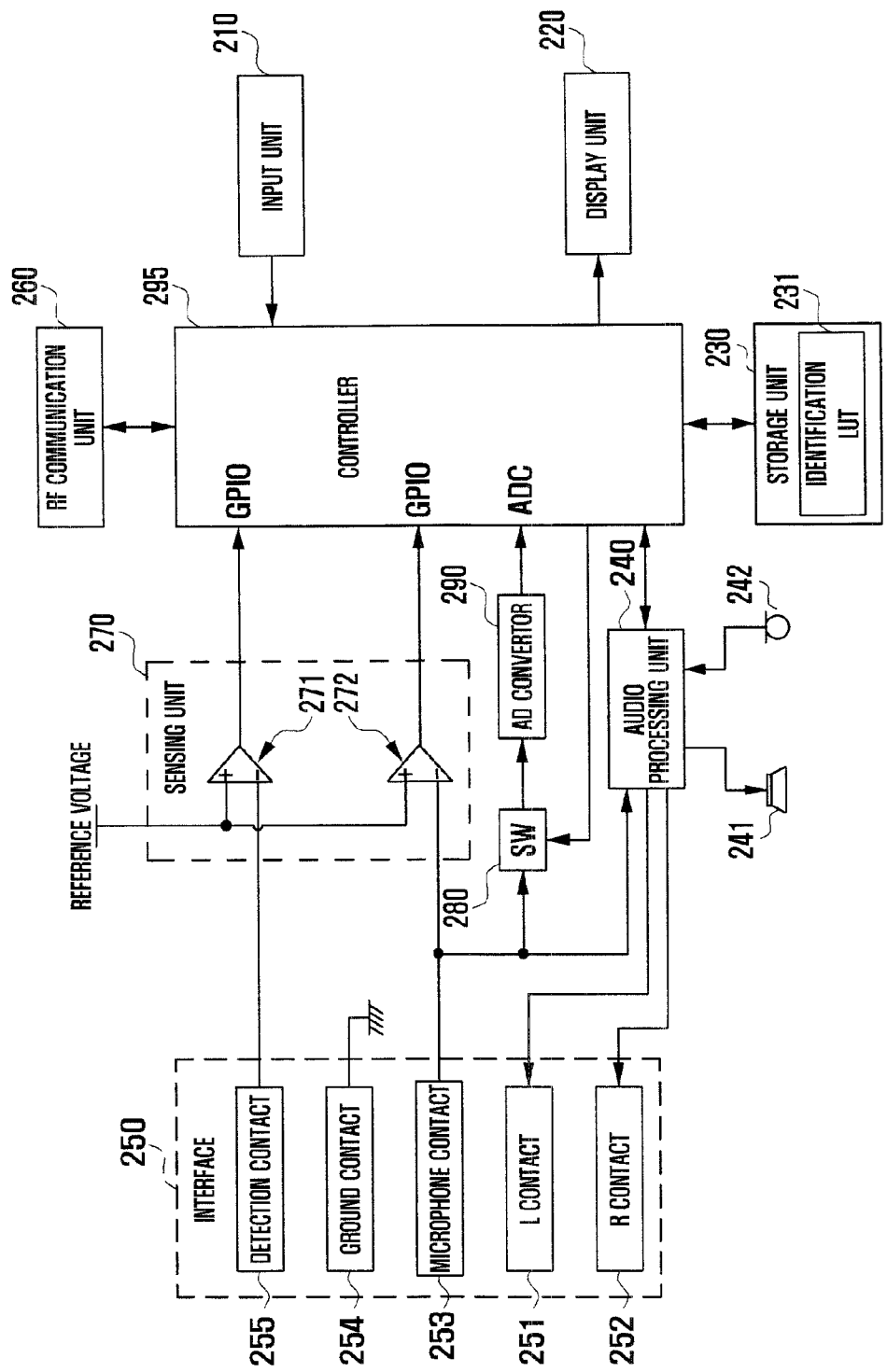
FIG. 2 illustrates a schematic block diagram of a mobile device according to an exemplary embodiment of the present invention.
Figure 3:
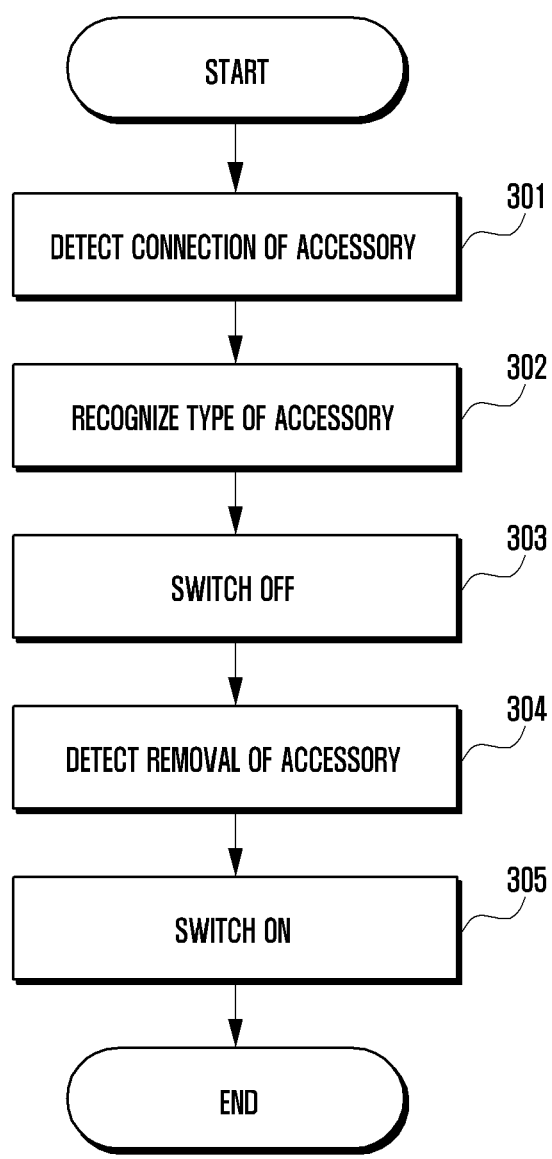
FIG. 3 is a flowchart describing a method for removing noise in a mobile device, according to an exemplary embodiment of the present invention.

FIGS. 1 through 3, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Hereinafter, exemplary embodiments of the present invention are described with reference to four-pole earphones. However, it should be understood that the present invention is not limited thereto. For example, the present invention may be implemented with various types of earphones that are connected to mobile devices and can perform a call function. Four-pole earphones are in general called a headset.

Although exemplary embodiments of the present invention are described based on mobile devices with interfaces connecting to earphones, it will be appreciated that the invention is not limited thereto. For example, the invention can be applied to any information communication device, multimedia device, and their applications, such as, mobile communication devices, mobile phones, smartphones, International Mobile Telecommunication 2000 (IMT-2000) mobile devices, Code Division Multiple Access (CDMA) mobile devices, Global System for Mobile communication (GSM) mobile devices, Wideband Code Division Multiple Access (WCDMA) mobile devices, High Speed Downlink Packet Access (HSDPA) mobile devices, World Interoperability for Microwave Access (Wimax) mobile devices, Universal Mobile Telecommunication Service (UMTS) mobile devices, and the like.

FIG. 1 illustrates a circuit diagram of a four-pole earphone according to an exemplary embodiment of the present invention.

Referring to FIG. 1, the four-pole earphone 100 includes an interface 110, a microphone 120, a left speaker 130 and a right speaker 140.

The interface 110 includes an earphone plug for connecting to an earphone jack of a mobile device and transmits/receives audio signals thereto/therefrom. The interface 110 includes a left contact (Ear_L) 111, a right contact (Ear_R) 112, a Microphone contact (MIC) 113, and a Ground contact (GND) 114.

The four-pole earphone 100 may further include a switch 150 with a switch resistor (R1) 160 and controls a call on/off function.

FIG. 2 illustrates a schematic block diagram of a mobile device according to an exemplary embodiment of the present invention.

Referring to FIG. 2, the mobile device 200 includes an input unit 210, a display unit 220, a storage unit 230, an audio processing unit 240, an interface 250, a Radio Frequency (RF) communication unit 260, a sensing unit 270, a switch 280, an Analog-to-Digital (AD) convertor 290, and a controller 295.

The input unit 110 includes a touch screen and a number of buttons. The input unit 110 transfers signals corresponding to key or touch events created by the user to the controller 295. Key or touch events includes events to enable a voice call function, to select a file stored in the storage unit 230, to playback the selected file, and the like.

The display unit 220 displays video data, output from the controller 295, user data requested by the user, additional screens, and the like. The display unit 220 may be implemented with a Liquid Crystal Display (LCD), an Organic Light Emitting Diode (OLED), or an application thereof. In an exemplary implementation, when the controller 295 detects that the earphone 100 is connected to the interface 250, the display unit 220 can display the state of the earphone 100 connection to the interface 250. For example, the display unit 220 can display a pop-up window, indicating that the earphone 100 is connected, or an icon at one side on the screen.

The storage unit 230 stores an Operating System (OS) for booting the mobile device 200. The storage unit 230 also stores application programs required to operate the functions of the mobile device 200, such as a file playback function, a camera function, a broadcast viewing function, and the like. The storage unit 230 also stores data generated when the mobile device 100 is operated, data received via the communication channel, and the like. The storage unit 230 includes a program storage area and a data storage area.

The program storage area stores application programs that support the functions described above. When the user requests a function, a corresponding application is enabled in the program storage area according to the control of the controller 295. In an exemplary implementation, the program storage area stores an application program that switches the switch 280 off to prevent noise from being introduced into an input-output terminal when a type of accessory connected to the interface 250 is identified.

The data storage area stores data created when application programs are executed, such as user's input data, phonebook data, and the like. In an exemplary implementation, the data storage area stores a look up table 231 to which the controller 295 refers in order to identify various types of accessories connected to the interface 250. The look up table 231 may be implemented in the following Table 1.

TABLE 1

| No | Resistance (KΩ, 1%) of accessory | Voltage (V) input to AD converter of mobile device | Types of Accessories |
|---|---|---|---|
| 1 | Open | 3.30 | Audio cables |
| 2 | 100.0 | 3.00 | 4-pole earphone |
| 3 | 56.0 | 2.80 | Reserved |
| 4 | 36.0 | 2.58 | Reserved |
| 5 | 27.0 | 2.41 | Reserved |
| 6 | 20.0 | 2.20 | Reserved |
| 7 | 15.0 | 1.98 | Reserved |
| 8 | 12.0 | 1.80 | Reserved |
| 9 | 9.1 | 1.57 | Reserved |
| 10 | 7.2 | 1.38 | Reserved |

TABLE 1-continued

| No | Resistance (KΩ, 1%) of accessory | Voltage (V) input to AD converter of mobile device | Types of Accessories |
|---|---|---|---|
| 11 | 5.6 | 1.18 | Reserved |
| 12 | 4.3 | 1.00 | Reserved |
| 13 | 3.1 | 0.78 | Reserved |
| 14 | 2.2 | 0.60 | Reserved |
| 15 | 1.3 | 0.38 | Reserved |
| 16 | 0.56 | 0.18 | Reserved |
| 17 | 0.0 | 0.00 | Reserved |

The audio processing unit 240 includes CODers and DECoders (CODECs). The audio processing unit 240 transfers audio signals, output from the controller 295, to an internal speaker 241 or an external speaker connected to the interface 250. The audio processing unit 240 also transfers audio signals such as voice, input via an internal microphone 242 or an external microphone connected to the interface 250, to the controller 295. The audio processing unit 240 converts voice/audio data into audible signals and outputs the data via a speaker, according to the control of the controller 295. The audio processing unit 240 also converts audio signals such as voice, received via a microphone, into digital signals and transfers the data to the controller 295.

The audio processing unit 240 can output an audio signal to inform the user when an earphone is connected/disconnected to/from the interface 250. The volume and the type of audio signal may be controlled via volume adjustment and menu settings of the mobile device 200.

The interface 250 includes an earphone jack for connecting to the earphone plug of the earphone 100 and transmits/receives audio signals and control signals between the controller 295 and the earphone 100. Examples of the control signals include a call signal, a call terminating signal, a volume up/down signal, a playback start/stop signal, and the like. The interface 250 includes a left contact 251, a right contact 252, a microphone contact 253, a ground contact 254, and a detection contact 255. The left contact 251, the right contact 252, and the microphone contact 253 receive bias electric power.

When the earphone plug of the earphone 100 is inserted into the earphone jack of the mobile device 200, the left contact 111, the right contact 112, the microphone contact 113, and the ground contact 114 of the earphone 100 are connected to the left contact 251, the right contact 252, the microphone contact 253, and the ground contact 254 of the mobile device 200, respectively. More particularly, the detection contact 255 of the earphone jack is connected to the ground contact 254. Alternatively, the interface 250 may be implemented in such a manner that the detection contact 255 of the earphone jack may be connected to the left contact 251, the right contact 252 or the microphone contact 253, instead of connecting to the ground contact 254, when the earphone jack receives the earphone plug. Alternatively, the interface 250 may be implemented in such a manner that the detection contact 255 of the earphone jack is connected to one of the left contact 251, the right contact 252, the microphone contact 253, and the ground contact 254, in a normal state where the earphone jack does not receive the earphone plug, and then disconnected from the connected contact when the earphone jack receives the earphone plug. That is, the interface 250 may be implemented to alter the voltage level in the detection contact 255 when the earphone plug is inserted to the earphone jack.

The RF communication unit 260 transmits/receives signals, to/from external systems, related to a mobile communication for the mobile device 200, Short Message Service (SMS) or Multimedia Message Service (MMS), voice or data communication, and the like. The RF communication unit 210 coverts voice/audio data and control data into RF signals and transmits the signals to external systems. The RF communication unit 210 also receives RF signals, converts the signals into voice/audio data and control data, and outputs the data. To this end, the RF communication unit 260 includes an RF transmitter for up-converting the frequency of signals to be transmitted and for amplifying the signals, and an RF receiver for low-noise amplifying received RF signals and for down-converting the frequency of the received RF signals.

The sensing unit 270 determines whether the interface 250 is connected to an accessory. If it is determined, by the sensing unit 270, that the interface 250 is connected to an accessory, the sensing unit 270 outputs a detected signal to the controller 295. The sensing unit 270 determines whether a control signal, such as a call signal, a call termination signal, and the like, is created in the earphone 100 connected to the interface 250. If it is determined that a control signal is created in the earphone 100, the sensing unit 270 outputs a detected signal regarding the created control signal to the controller 295. The detected signal may be input to a General Purpose Input/Output (GPIO) of the controller 295. The sensing unit 270 includes a first comparator 271 for determining whether an accessory is connected to the mobile device 200 and a second comparator 272 for determining whether a control signal is created.

The first comparator 271 is operated as follows. When the earphone plug is connected to the earphone jack, it is assumed that the detection contact 250 is connected to the ground contact 254, i.e., the voltage level of the detection contact 250 drops from a bias voltage level V_Bias, 3.3 V, to the ground voltage level, 0 V.

The first comparator 271 is configured in such a manner that the non-inverting input terminal (+) receives a reference voltage (e.g., 2.8 V) and the inverting input terminal (−) is connected to the detection contact 250. The first comparator 271 compares the voltage level of the non-inverting input terminal (+) with the voltage level of the inverting input terminal (−). When the voltage level of the non-inverting input terminal (+) is greater than the voltage level of the inverting input terminal (−), the first comparator 271 outputs a high level signal. The first comparator 271 otherwise outputs a low level signal. That is, while outputting a low level signal in a normal state, the first comparator 271 outputs a high level signal when the earphone plug is inserted into the earphone jack. In an exemplary implementation, outputting a high level signal refers to a state in which an earphone jack receives an earphone plug. Alternatively, the circuit, according to an exemplary embodiment of the present invention, may be modified in such a manner that the state where an earphone jack receives an earphone plug can be represented by outputting a low level signal. In this case, the non-inverting input terminal (+) is connected to the detection contact 250 and the reference voltage is applied to the inverting input terminal (−). Alternatively, a higher reference voltage may be applied to the first comparator 271 than the bias voltage, so that the first comparator 271 can output a high level signal in a normal state.

The second comparator 272 operates as follows. It is assumed herein that the resistance of the microphone 120 of the earphone 100 is 100 KΩ, as shown in Table 1, and the switch resister 160 is 1 KΩ.

The second comparator 272 is configured in such a manner that the non-inverting input terminal (+) receives a reference voltage (e.g., 2.8 V) and the inverting input terminal (−) is connected to the microphone contact 253. The second comparator 272 compares the voltage level of the non-inverting input terminal (+) with that of the inverting input terminal (−). When the voltage level of the non-inverting input terminal (+) is greater than the voltage level of the inverting input terminal (−), the second comparator 272 outputs a high level signal. The second comparator 272 otherwise outputs a low level signal. That is, since the non-inverting input terminal (+) is biased with a higher voltage level than the reference voltage in a normal state, the second comparator 272 outputs a low level signal. Although the earphone plug is inserted into the earphone jack, when the switch 150 of the earphone 100 is switched off, the voltage level of the non-inverting input terminal (+) is 3.0 V (refer to Table 1) greater than the reference voltage. Therefore, the second comparator 272 outputs a low level signal. On the contrary, when the switch 150 is switched on in a state in which the earphone plug is inserted into the earphone jack, the voltage level of the non-inverting input terminal (+) is lower than the reference voltage. Therefore, the second comparator 272 outputs a high level signal. In an exemplary implementation, outputting a high level signal refers to outputting a control signal from the earphone 100 to the controller 295. Alternatively, the circuit, according to an exemplary embodiment of the present invention, may be modified in such a manner that outputting a control signal from the earphone 100 to the controller 295 may be represented by outputting a low level signal.

The switch 280 connects/disconnects between the microphone contact 253 and an Analog-to-Digital Converter (ADC) port of the controller 295. The controller 295 is connected to the AD converter 290 via the ADC port.

The AD convertor 290 converts analog signals, transferred via the switch 280 from the microphone contact 253, into digital signals, and outputs the signals to the controller 295. The AD converter 290 may be included in the controller 295.

The controller 295 controls the operations of the mobile device 200 and signals flowing among the components therein. The controller 295 is operated as described below.

When the controller 295 receives a signal indicating an 'earphone plug insertion state' from the sensing unit 270, e.g., the first comparator 271, the controller 295 analyzes a digital signal transferred from the AD converter 290, and determines a voltage level. The controller 295 compares the determined voltage level with a voltage level referenced in the look up table 231, and identifies a type of accessory connected to the interface 250. When the controller 295 determines that the identified accessory is an audio cable or an earphone 100, it controls the audio processing unit 240 to output an audio signal via the left and right contacts 251 and 252, instead of the speaker 241. Likewise, when the controller 295 determines that the identified accessory is an earphone 100, it controls the audio processing unit 240 to receive an audio signal via the microphone contact 253. Alternatively, when the controller 295 determines that the identified accessory is an earphone 100, it performs an operation according to a control signal transferred from the second comparator 272. For example, when the controller 295 receives a control signal from the second comparator 272, it controls the RF communication unit 210 to connect a last called party's mobile device. When the controller 295 receives a control signal from the second comparator 272 while the mobile device 200 is calling the called party, it controls the RF communication unit 210 to terminate (i.e., stop) the called party's mobile device.

After identifying the type of accessory, the controller 295 controls the switch 280 to disconnect the microphone contact 253 and the ADC port. The disconnection prevents electrical power noise and Time Division Multiple Access (TDMA) noise from being introduced to the audio processing unit 240 via a wire connecting the microphone contact 253 and the ADC port. That is, the controller 295 can prevent the introduction of electrical power noise and TDMA noise, thereby enhancing call quality and voice recording quality.

Since GSM mobile devices may consume more electric power during data transmission than during data reception, TDMA noise occurs over a certain range of frequency. For example, each time that GSM mobile devices output transmission power to transmit data, TDMA noise occurs with respect to a frequency of 217 Hz. Therefore, TDMA noise occurs in voice bands, such as 217 Hz, 434 Hz (2nd harmonic), 615 Hz (3rd harmonic), 868 Hz (4th harmonic), 1085 Hz (5th harmonic), and the like. The TDMA noise is introduced to the wire between the microphone contact 253 and the ADC port, so that it is added to the audio signals input to the audio processing unit 240 via the microphone contact 253. Therefore, when the wire is broken, the TDMA noise cannot be added to the audio signal.

Meanwhile, when the controller 295 receives a signal indicating an 'earphone plug removal state' from the sensing unit 270, e.g., the first comparator 271, it controls the switch 280 to connect the microphone contact 253 and the ADC port.

FIG. 3 is a flowchart describing a method for removing noise in a mobile device, according to an exemplary embodiment of the present invention.

The sensing unit 270 detects that an accessory is connected to the mobile device 200 in step 301. When the accessory is connected to the interface 250, the voltage level is changed in the detection contact 255 of the interface 250. The sensing unit 270 detects the change in the voltage level of the detection contact 255, and outputs it to the controller 295. For example, when an accessory is connected to the interface 250, the voltage level of the detection contact 255 increases from the ground voltage level to a bias voltage level or decreases from a bias voltage level to the ground voltage level. The sensing unit 270 outputs a detected signal corresponding to the connection of an accessory to the controller 295. For example, when the sensing unit 270 detects the connection of the accessory while outputting a low level signal, it can output a high level signal or vice versa.

When the controller 295 receives the detected signal corresponding to the connection of an accessory from the sensing unit 270, it identifies the type of accessory connected to the interface 250 in step 302. For example, when the AD converter 290 converts an analog signal transferred from the microphone contact 253 into a digital signal, and outputs it to the controller 295, the controller 295 analyzes the digital signal and determines a voltage level. The controller 295 compares the determined voltage level with a voltage level referenced in the look up table 231, and identifies the type of accessory connected to the interface 250.

Thereafter, the controller 295 switches the switch 280 off in order to prevent electrical power noise and TDMA noise from being introduced into the audio signal that is input to the audio processing unit 240 via the microphone contact 253, when the user makes a voice call or records his/her voice using the microphone 120 of the earphone 100 in step 303.

The sensing unit 270 detects that the accessory is removed from the mobile device 200 in step 304. When the accessory is removed from the interface 250 of the mobile device 200, the voltage level is changed in the detection contact 255. The sensing unit 270 detects the change in the voltage level of the detection contact 255, and outputs it to the controller 295.

When the controller 295 detects the removal of an accessory via the sensing unit 270, it switches the switch 280 on in step 305.

As described above, exemplary embodiments of the present invention provide a noise removal system and method for preventing noise, created by electric power and by TDMA communication, from being added to audio signals input to the audio processing unit via the microphone contact, thereby enhancing voice call quality and voice recording quality.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A noise removal system, the system comprising:
    an interface including a microphone contact, configured to connect to an accessory;
    an Analog-to-Digital (AD) converter configured to convert an analog voltage level, input via the microphone contact, into a digital voltage level;
    an audio processing unit configured to process an audio signal input via the microphone contact;
    a switch configured to connect or disconnect the microphone contact and the AD converter; and
    a controller configured to identify a type of accessory connected to the interface by comparing the digital voltage level with voltage levels stored in a storage unit, and to switch off the switch to disconnect the microphone contact and the AD converter after identifying the type of accessory.

2. The system of claim 1, further comprising:
    a sensing unit configured to determine whether the accessory is connected to the interface and to output a connection state to the controller,
    wherein the controller receives a signal, indicating that the accessory is removed from the interface, from the sensing unit, and switches the switch on.

3. The system of claim 2, wherein the interface comprises a detection contact, and wherein the sensing unit detects a change in a voltage level of the detection contact and outputs a signal to the controller indicating whether the accessory is connected to the interface.

4. The system of claim 3, wherein the interface comprises a ground contact, and wherein the detection contact is connected to the ground contact when the accessory is inserted into the interface, and disconnected from the ground contact when the accessory is removed from the interface.

5. The system of claim 3, wherein the voltage level of the detection contact increases from the ground voltage level to a bias voltage level, or decreases from the bias voltage level to the ground voltage level, when the accessory is connected to the interface.

6. The system of claim 4, wherein the noise comprises Time Division Multiple Access (TDMA) noise.

7. A method for removing noise in a system that includes an interface including a microphone contact for connecting to an accessory, an Analog-to-Digital (AD) converter for converting an analog voltage level input via the microphone contact into a digital voltage level, and a switch for connecting or disconnecting the microphone contact and the AD converter, the method comprising:
    determining whether an accessory is connected to the interface;
    identifying a type of accessory connected to the interface by comparing the digital voltage level with voltage levels stored in a storage unit; and
    switching off the switch to disconnect the microphone contact and the AD converter after identifying the type of accessory.

8. The method of claim 7, further comprising:
    switching on the switch to connect the microphone contact and the AD converter when the accessory is removed from the interface.

9. The method of claim 8, wherein the interface comprises a detection contact and a ground contact.

10. The method of claim 9, wherein a voltage level of the detection contact increases from the ground voltage level to a bias voltage level, or decreases from the bias voltage level to the ground voltage level, when the accessory is connected to the interface.

* * * * *